(12) United States Patent
Zhang

(10) Patent No.: US 12,321,436 B2
(45) Date of Patent: Jun. 3, 2025

(54) METHOD AND APPARATUS FOR DATA ACQUISITION, DEVICE AND STORAGE MEDIUM

(71) Applicants: JINGDONG TECHNOLOGY INFORMATION TECHNOLOGY CO., LTD., Beijing (CN); JINGDONG TECHNOLOGY HOLDING CO., LTD., Beijing (CN)

(72) Inventor: Zuoyi Zhang, Beijing (CN)

(73) Assignees: JINGDONG TECHNOLOGY INFORMATION TECHNOLOGY CO., LTD., Beijing (CN); JINGDONG TECHNOLOGY HOLDING CO., LTD., Beijing (CN)

( * ) Notice: Subject to any disclaimer, the term of this patent is extended or adjusted under 35 U.S.C. 154(b) by 227 days.

(21) Appl. No.: 18/261,330

(22) PCT Filed: Dec. 20, 2021

(86) PCT No.: PCT/CN2021/139722
§ 371 (c)(1),
(2) Date: Jul. 13, 2023

(87) PCT Pub. No.: WO2022/151925
PCT Pub. Date: Jul. 21, 2022

(65) Prior Publication Data
US 2024/0070253 A1 Feb. 29, 2024

(30) Foreign Application Priority Data
Jan. 13, 2021 (CN) .......................... 202110041858.2

(51) Int. Cl.
*G06F 21/33* (2013.01)
*G06F 21/36* (2013.01)
*G06F 21/64* (2013.01)

(52) U.S. Cl.
CPC .............. *G06F 21/33* (2013.01); *G06F 21/36* (2013.01); *G06F 21/64* (2013.01)

(58) Field of Classification Search
CPC .......... G06F 21/33; G06F 21/36; G06F 21/64; G06F 21/45; G06F 21/602; G06F 2221/2133
(Continued)

(56) References Cited

U.S. PATENT DOCUMENTS

2017/0180128 A1  6/2017 Lu
2020/0304480 A1* 9/2020 Buchner ................. H04L 63/08
(Continued)

FOREIGN PATENT DOCUMENTS

CN  109660346 A  *  4/2019  ......... H04L 63/0442
CN  110060162 A     7/2019
(Continued)

OTHER PUBLICATIONS

Invitation to Respond to Written Opinion issued in counterpart Singapore Patent Application No. 11202305377U, dated Oct. 11, 2024.
(Continued)

*Primary Examiner* — Jacob Lipman
(74) *Attorney, Agent, or Firm* — Westbridge IP LLC

(57) ABSTRACT

Disclosed are a method and an apparatus for data acquisition, a device and a storage medium. The method includes: acquiring a data calling request sent by a first terminal; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity;
(Continued)

sending a data authorization request to a second terminal corresponding to the data authorization user according to the data authorization certificate; encrypting the request result corresponding to the data calling request after confirming that the data authorization user confirms the authorization, and sending the encrypted request result to the first terminal.

17 Claims, 4 Drawing Sheets

(58) Field of Classification Search
USPC .......................................................... 726/17
See application file for complete search history.

(56) References Cited

U.S. PATENT DOCUMENTS

| | | | |
|---|---|---|---|
| 2020/0322152 | A1 | 10/2020 | Smets et al. |
| 2020/0374137 | A1 | 11/2020 | Godfrey |

FOREIGN PATENT DOCUMENTS

| | | | |
|---|---|---|---|
| CN | 110070926 | A | 7/2019 |
| CN | 110910978 | A | 3/2020 |
| CN | 110990804 | A | 4/2020 |
| CN | 111010372 | A | 4/2020 |
| CN | 111970129 | A | 11/2020 |
| CN | 111986764 | A | 11/2020 |
| CN | 112733121 | A | 4/2021 |
| IN | 201717021451 | A | 12/2017 |
| JP | 2011503688 | A | 1/2011 |
| JP | 2013179489 | A | 9/2013 |
| JP | 2018160220 | A | 10/2018 |
| JP | 3222165 | U | 7/2019 |
| WO | 2020062667 | A1 | 4/2020 |
| WO | 2020119506 | A1 | 6/2020 |

OTHER PUBLICATIONS

Notice of Reasons for Refusal issued in counterpart Japanese Patent Application No. 2023-542729, dated Sep. 3, 2024.
Notification to Grant Patent Right for Invention issued in counterpart Chinese Patent Application No. 202110041858.2, dated Jul. 2, 2024.
Search Report issued in counterpart Singapore Patent Application No. 11202305377U, dated Oct. 11, 2024.
Written Opinion issued in counterpart Singapore Patent Application No. 11202305377U, dated Oct. 11, 2024.
First Office Action issued in counterpart Chinese Patent Application No. 202110041858.2, dated Jan. 3, 2024.
International Search Report and Written Opinion issued in corresponding PCT Application No. PCT/CN2021/139722, dated Mar. 2, 2022.
Notice of Reasons for Refusal issued in counterpart Japanese Patent Application No. JP 2023-542729, dated Feb. 25, 2025.

* cited by examiner

METHOD AND APPARATUS FOR DATA ACQUISITION, DEVICE AND STORAGE MEDIUM

CROSS-REFERENCE TO RELATED APPLICATIONS

This application is the National Stage of International Application No. PCT/CN2021/139722, filed on Dec. 20, 2021, which claims priority to Chinese Patent Application No. 202110041858.2, entitled "METHOD AND APPARATUS FOR DATA ACQUISITION, DEVICE AND STORAGE MEDIUM" and filed with China National Intellectual Property Administration on Jan. 13, 2021. All of the aforementioned applications are incorporated herein by reference in their entireties.

TECHNICAL FIELD

This application generally relates to the technical field of blockchain, and more particularly to a method and an apparatus for data acquisition, an electronic device and a storage medium.

BACKGROUND

In the era of digital economy, the importance of data security and privacy protection has become increasingly prominent. Therefore, many data security protection schemes have emerged. In the prior art, by building a big data center platform, the data that needs to be shared is authorized for access through the big data center platform, so as to realize the authorized access of data.

It can be seen that the existing technical scheme is centralized, and the import and export of data are managed through the big data center platform.

SUMMARY

In a first aspect, this application relates to a method for data acquisition, applied to an alliance chain, the method for data acquisition includes:
  acquiring a data calling request sent by a first terminal, where, the data calling request carries a first decentralized identity of a data authorization user and an identity of a data calling user;
  performing identity authentication to the data calling user corresponding to the first terminal according to the data calling request;
  assigning a second decentralized identity to the data calling user when the data calling user is authenticated legal;
  querying a data authorization certificate of the data authorization user by using the first decentralized identity according to the second decentralized identity;
  sending a data authorization request to a second terminal corresponding to the data authorization user according to the data authorization certificate; and
  encrypting the request result corresponding to the data calling request after confirming that the data authorization user confirms the authorization, and sending the encrypted request result to the first terminal.

In some embodiments, before querying the data authorization certificate of the data authorization user by using the first decentralized identity according to the second decentralized identity, the method further includes:
  acquiring a data preservation request sent by the second terminal, where, the data preservation request carries the identity of the data authorization user;
  performing identity authentication to the data authorization user according to the data preservation request;
  assigning the first decentralized identity to the data authorization user when the data authorization user is authenticated to be legal; and
  distributing the data authorization certificate to the data authorization user according to the first decentralized identity.

In some embodiments, the data calling request includes: an identity type of the data calling user;
  performing identity authentication to the data calling user corresponding to the first terminal according to the data calling request includes:
  performing identity authentication to the data calling user by using a face recognition technology when the identity type of the data calling user is individual; and
  performing identity authentication to the data calling user by using an enterprise authentication technology when the identity type of the data calling user is enterprise.

In some embodiments, the data preservation request includes: an identity type of the data authorization user;
  performing identity authentication to the data authorization user according to the data preservation request, includes:
  performing identity authentication to the data authorization user by using the face recognition technology when the identity type of the data authorization user is the individual; and
  performing identity authentication to the data authorization user by using the enterprise authentication technology when the identity type of the data authorization user is the enterprise.

In some embodiments, sending the data authorization request to the second terminal corresponding to the data authorization user according to the data authorization certificate includes:
  initiating the data authorization request according to the data authorization certificate, and digitally signing the data authorization request by using a pre-stored private key, generating authorization request verification information, sending the authorization request verification information to the second terminal corresponding to the data authorization user.

In some embodiments, after sending the authorization request verification information to the second terminal corresponding to the data authorization user method further includes:
  acquiring indication information that a verification operation is running returned by the second terminal;
  verifying the first decentralized identity of the data authorization user, and the data authorization certificate; and
  sending indication information for executing a data authorization operation to the second terminal when the verification is legal.

In some embodiments, the authorization request verification information includes any one of a two-dimensional code, a bar code and a verification code;
  generating the authorization request verification information, sending the authorization request verification information to the second terminal corresponding to the data authorization user includes:
  generating the two-dimensional code and sending the two-dimensional code to the second terminal corresponding to the data authorization user;

or, generating the bar code and sending the bar code to the second terminal corresponding to the data authorization user;

or, generating the verification code and sending the verification code to the second terminal corresponding to the data authorization user.

In some embodiments, the data calling request further includes: a data authorization certificate type;

querying the data authorization certificate of the data authorization user by using the first decentralized identity according to the second decentralized identity includes:

querying the data authorization certificate type corresponding to the data authorization certificate type in the data calling request, by using the first decentralized identity according to the second decentralized identity.

In some embodiments, the method for data acquisition applied to an alliance chain further includes:

calculating hash values of an identity authentication record corresponding to the identity authentication, the data authorization certificate, the data authorization request and a data authorization record corresponding to the data authorization request respectively by using a hash algorithm, and storing the hash values in the alliance chain.

In a second aspect, this application relates to a method for data acquisition, applied to a second terminal, the method for data acquisition including:

receiving a data authorization request sent by an alliance chain;

where, the data authorization request is sent by the alliance chain after: acquiring a data calling request sent by a first terminal; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity; where, the data calling request carries a first decentralized identity of a data authorization user and an identity of a data calling user; and performing an authorization operation according to the data authorization request.

In some embodiments, receiving the data authorization request sent by the alliance chain includes:

receiving authorization request verification information sent by the alliance chain;

performing the authorization operation according to the data authorization request includes:

verifying the authorization request verification information, and returning indication information that the verification operation is running to the alliance chain;

receiving indication information for executing a data authorization operation sent by the alliance chain; and executing an authorization operation according to the indication information for executing the data authorization operation, and digitally signing the authorization operation by using a pre-stored private key.

In some embodiments, the authorization request verification information includes any one of a two-dimensional code, a bar code and a verification code;

verifying the authorization request verification information, and returning indication information that the verification operation is running to the alliance chain includes:

calling a code scanning function to scan the two-dimensional code, and returning indication information that the verification operation is running to the alliance chain;

or, calling a code scanning function to scan the bar code, and returning indication information that the verification operation is running to the alliance chain;

or, calling a verification function to verify the verification code, and returning indication information that the verification operation is running to the alliance chain.

In a third aspect, this application related to an apparatus for data acquisition, the apparatus including:

an acquisition module, configured for acquiring a data calling request sent by a first terminal, where, the data calling request carries a first decentralized identity of a data authorization user and an identity of a data calling user;

an authentication module, configured for performing identity authentication to the data calling user corresponding to the first terminal according to the data calling request;

an assignment module, configured for assigning a second decentralized identity to the data calling user when the data calling user is authenticated legal;

a querying module, configured for querying a data authorization certificate of the data authorization user by using the first decentralized identity according to the second decentralized identity;

a first sending module, configured for sending a data authorization request to a second terminal corresponding to the data authorization user according to the data authorization certificate; and a second sending module, configured for encrypting the request result corresponding to the data calling request after confirming that the data authorization user confirms the authorization, and sending the encrypted request result to the first terminal.

In a fourth aspect, this application relates to an apparatus for data acquisition, the apparatus including:

a receiving module, configured for receiving a data authorization request sent by an alliance chain;

where, the data authorization request is sent by the alliance chain after: acquiring a data calling request sent by a first terminal; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity; where, the data calling request carries a first decentralized identity of a data authorization user and an identity of a data calling user; and an authorization module, configured for performing an authorization operation according to the data authorization request.

In a fifth aspect, this application relates to an electronic device, which includes a processor, a communication component, a memory and a communication bus, where the processor, the communication component and the memory communicate with each other through the communication bus; the memory is configured for storing computer programs; and the processor is configured to implement the method for data acquisition applied to an alliance chain according to the first aspect, or to implement the method for data acquisition applied to a second terminal according to the second aspect.

In a sixth aspect, this application relates to a computer-readable storage medium, where a program is stored on the computer-readable storage medium, the program, when executed by a processor, implements the method for data acquisition applied to an alliance chain according to this application, or implements the method for data acquisition applied to a second terminal according to this application.

In some embodiments, the method provided by the embodiment of the present application, which is applied to an alliance chain, avoids that all data is stored in a central platform by utilizing the distributed characteristics of the alliance chain; in the present application, acquiring a data calling request sent by a first terminal, and performing identity authentication to the data calling user corresponding to the first terminal according to the data calling request, effectively solves the problem of illegal user intrusion, and assigning a second decentralized identity to the data calling user when the data calling user is authenticated legal, so that in the alliance chain the data calling user takes the second decentralized identity as the unique identity; querying a data authorization certificate of the data authorization user by using the first decentralized identity according to the second decentralized identity, sending a data authorization request to a second terminal corresponding to the data authorization user according to the data authorization certificate, and encrypting the request result corresponding to the data calling request after confirming that the data authorization user confirms the authorization, and sending the encrypted request result to the first terminal, thus effectively improves the data security.

BRIEF DESCRIPTION OF THE DRAWINGS

The accompanying drawings which are incorporated in and constitute a part of the specification illustrate embodiments consistent with the application and together with the description serve to explain the principles of the application.

In order to more clearly explain the technical solution of this application, the drawings of this application will be briefly introduced below, and it will be obvious that other drawings can be obtained from these drawings without creative labor for those of ordinary skill in the art.

DETAILED DESCRIPTION OF THE EMBODIMENTS

In order to make the purposes, technical aspects and advantages of the disclosed embodiments clearer, the technical aspects of the disclosed embodiments will be clearly and completely described below in conjunction with the accompanying drawings in the disclosed embodiments, and it will be apparent that the described embodiments are part of, but not all of, the embodiments of the disclosed embodiments. Based on the embodiments in the present application all other embodiments obtained without creative effort by those of ordinary skill in the art fall within the scope of protection of the present application.

Figure 1:
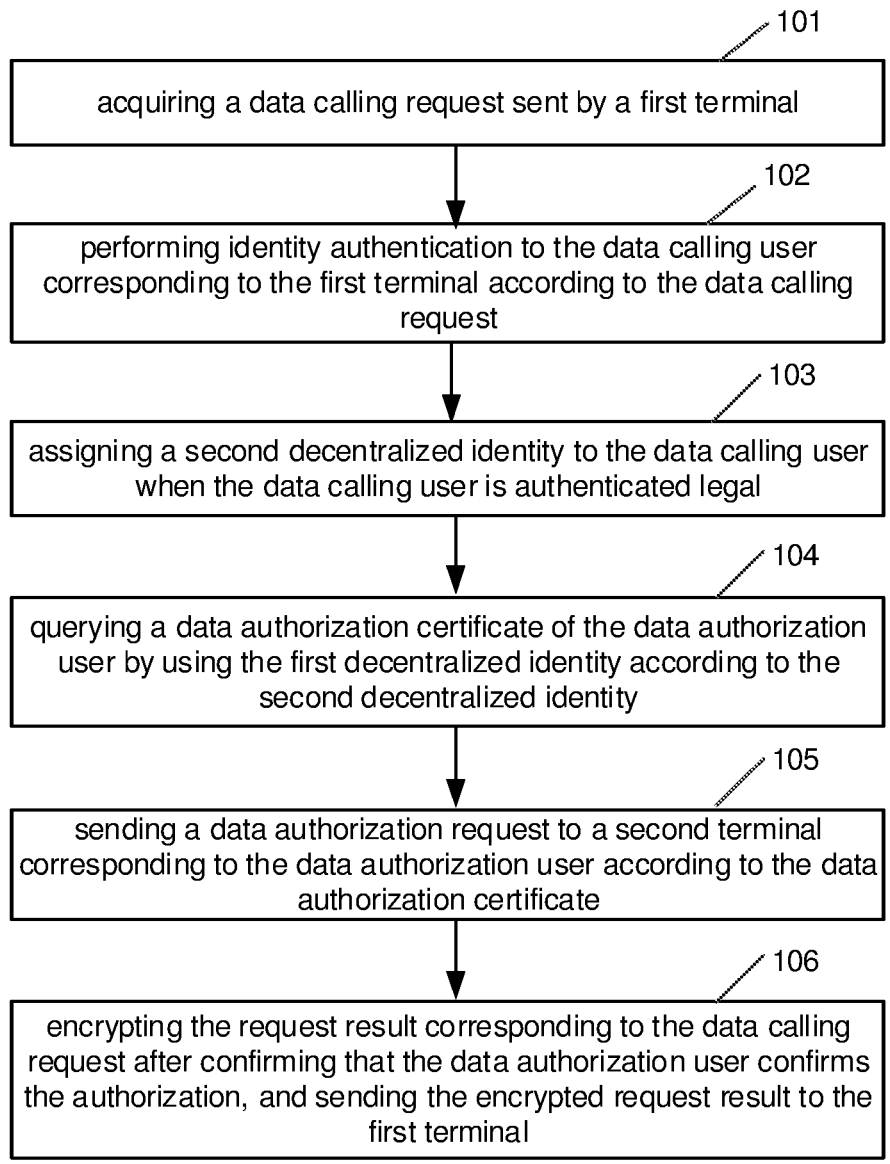
FIG. 1 is a flow diagram of a method for data acquisition applied to an alliance chain in an embodiment of the present application.

The present application relates to a method for data acquisition. This method is applied to an alliance chain, the implementation of this method is shown in FIG. 1:

Step 101, acquiring a data calling request sent by the first terminal;

Step 102, performing identity authentication to the data calling user corresponding to the first terminal according to the data calling request;

Step 103, assigning a second decentralized identity to the data calling user when the data calling user is authenticated legal;

Step 104, querying a data authorization certificate of the data authorization user by using the first decentralized identity according to the second decentralized identity;

Step 105, sending a data authorization request to a second terminal corresponding to the data authorization user according to the data authorization certificate; and Step 106, encrypting the request result corresponding to the data calling request after confirming that the data authorization user confirms the authorization, and sending the encrypted request result to the first terminal.

In some embodiments, the data calling request carries a first decentralized identity of a data authorization user and an identity of a data calling user.

In some embodiments, the alliance chain only targets members of a specific group and a limited number of third parties, and a plurality of preselected nodes are designated as bookkeepers within the alliance chain, and the generation of each block is jointly determined by all preselected nodes.

An alliance chain is established by using blockchain technology. In order to store authorization-related data and identity-related data separately and further guarantee data security, an alliance chain can be established by establishing a data authorization and verification alliance chain and a decentralized identity alliance chain, where, the data authorization and verification alliance chain is used for certificate storage service and the decentralized identity alliance chain is used for identity authentication service. Of course, it is also possible to establish a data authorization verification and decentralized identity alliance chain, and the data authorization verification and decentralized identity alliance chain is used for both certificate storage service and identity authentication service.

Hereinafter, the establishment of a data authorization and verification alliance chain and a decentralized identity alliance chain will be described as examples. Of course, this is only an example and is not intended to limit the protection scope of the present application. Further some other illustrations in the present application are not intended to limit the scope of protection of the present application and will not be described one by one.

In some implementation schemes, the participants of the data authorization and verification alliance chain include: courts, notary offices, third-party authentication institutions, regulatory authorities, the ministry of education, data custodians and other enterprises and institutions participating in the maintenance and operation of alliance chain nodes. Among them, the data authorization and verification alliance chain aims to provide a decentralized blockchain hash and hash evidence storage service, ensuring that the hash information corresponding to the authorized access records of the whole life cycle of data authorization access can be stored on the chain and verified on the chain.

Participants in the decentralized identity alliance chain include: Certificate Authority (referred to as CA), courts, notary offices, third-party authentication institutions, regulatory authorities, the ministry of education and other enterprises and institutions participating in the maintenance and operation of alliance chain nodes. Among them, the decentralized identity alliance chain aims to provide a decentralized mobile authentication service.

In some embodiments, Mini Program is an application that can be used without downloading and installing, and the user can open the application by scanning or searching. Users don't have to worry about installing too many applications. The applications are available at any time, but there is no need to install or uninstall them. It can be seen that adopting the mini program is convenient and quick, and can save the memory space of the terminal for users.

In some embodiments, a decentralized identity alliance chain receives a data calling request sent by a mini program running on a first terminal. A data calling user logs in to the mini program on the first terminal according to the identity of the data calling user, and searches for a first decentralized identity of the data authorization user, and initiates a data calling request. The decentralized identity alliance chain assigns a second decentralized identity to the data calling user as a unique identity of the data calling user on the chain.

In some embodiments, the mini program of the present application is a decentralized identity based mobile mini program. By adopting a mini program on the mobile side, the request can be initiated at any time under the mobile Internet, so that users are not limited by region or time.

In some embodiments, the data calling request includes an identity type of the data calling user.

In some embodiments, the decentralized identity alliance chains receives the data calling request sent by the mini program running on the first terminal, acquires the identity type of the data calling user in the data calling request, and performs identity authentication to the data calling user by using a face recognition technology when the identity type of the data calling user is individual; and performs identity authentication to the data calling user by using an enterprise authentication technology when the identity type of the data calling user is enterprise.

In some embodiments, when the identity type of the data calling user is an individual, the decentralized identity alliance chain judges whether there is a face on the input face image, and if there is a face, further gives the position and size of each face and the position information of each main facial organ. According to the information, the identity feature contained in each face is further extracted, and the extracted identity feature is compared with the pre-stored face feature to obtain a first matching degree. When the first matching degree is greater than a first preset value, it is determined that the data calling user authentication is successful, otherwise, it is determined that the data calling user authentication fails.

In some embodiments, when the identity type of the data calling user is an enterprise, the decentralized identity alliance chain compares the input enterprise information with the pre-saved enterprise information to obtain a second matching degree. When the second matching degree is greater than a second preset value, it is determined that the data calling user authentication is successful, otherwise, it is determined that the data calling user authentication fails.

In some implementations, when authentication is performed on the data calling user, the private key signed by the data calling user during the data calling is securely stored through the key escrow service provided by the CA organization.

In some embodiments, the decentralized identity alliance chain assigns a second decentralized identity to the data calling user when authenticates the data calling user to be legal, and the data calling user uses the second decentralized identity as a unique identity in the decentralized identity alliance chain and the data authorization verification alliance chain.

Figure 2:
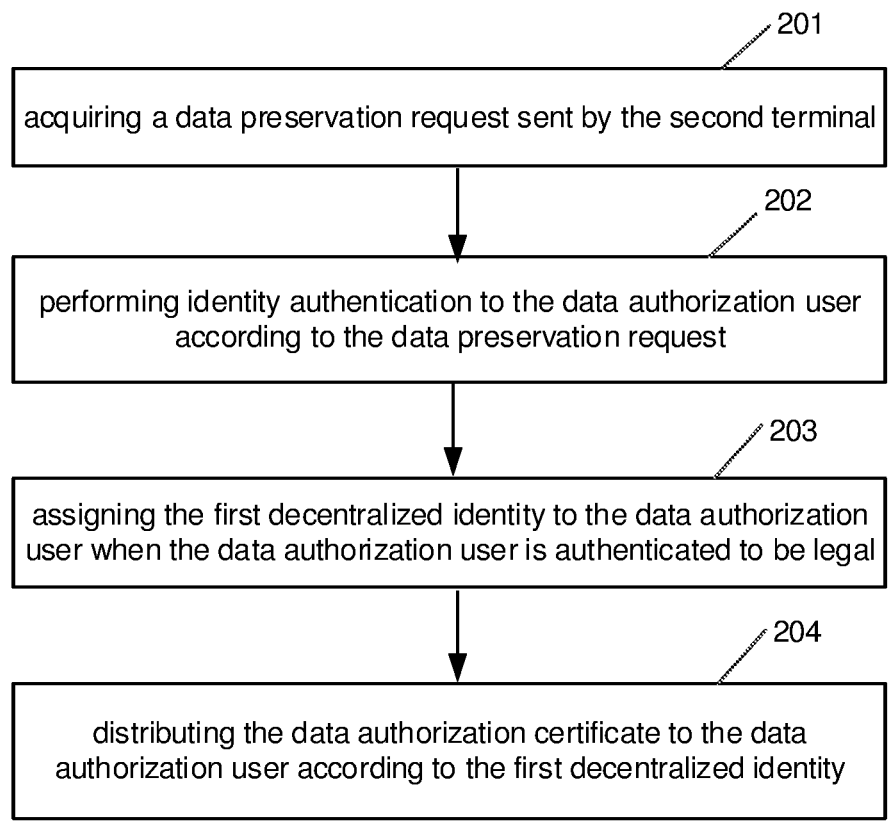
FIG. 2 is a flow diagram of obtaining a data authorization certificate in an embodiment of the present application.

In some embodiments, the data authorization user applies for a first decentralized identity through a decentralized identity based mini program on the mobile side, and obtains a data authorization certificate according to the first decentralized identity, as shown in FIG. 2:

Step 201, acquiring a data preservation request sent by the second terminal, where the data preservation request carries the identity of the data authorization user;

Step 202, performing identity authentication to the data authorization user according to the data preservation request;

Step 203, assigning the first decentralized identity to the data authorization user when the data authorization user is authenticated to be legal; and Step 204, distributing the data authorization certificate to the data authorization user according to the first decentralized identity.

In some embodiments, a decentralized identity alliance chain acquires a data preservation request sent by a mini program running on the second terminal.

In some embodiments, the data preservation request includes an identity type of the data authorization user.

In some implementations, the decentralized identity alliance chain acquires the identity type of the data authorization request in the data preservation request, and performs identity authentication to the data authorization user by using the face recognition technology when the identity type of the data authorization user is the individual; and performs identity authentication to the data authorization user by using the enterprise authentication technology when the identity type of the data authorization user is the enterprise.

In some implementations, when identity authentication is performed on the data authorization user, the private key during user authorization signing by the data authorization user is securely stored through the key escrow service provided by the CA organization.

In some embodiments, the decentralized identity alliance chain assigns a first decentralized identity to the data authorization user when the data authorization user is authenticated to be legal, and the data authorization user uses the first decentralized identity as a unique identity in the decentralized identity alliance chain and the data authorization and verification alliance chain.

In some embodiments, a data custodian in a data authorization and verification alliance chain distributes a data authorization certificate to a data authorization user according to a first decentralized identity. At this point, the data authorization user can view the data authorization certificate in the mini program.

In some embodiments, after distributing data authorization certificate to data authorization user, the data authorization and verification alliance chain respectively calculating hash values of an identity authentication record and a data authorization certificate through a hash algorithm, and stores the hash values. Among them, the identity authentication record is the process that the data authorization user initiates the data preservation request until the data authorization user is authenticated legal.

In some embodiments, the data calling request further includes a data authorization certificate type. Of course, a data authorization user has at least one type of data authorization certificate. The decentralized identity alliance chain queries the data authorization certificate type corresponding to the data authorization certificate type in the data calling request, by using the first decentralized identity according to the second decentralized identity.

In some implementation schemes, taking the data authorization certificate being an academic certificate as an example, a Company A wants to obtain the academic certificate of a user B, and the Company A initiates a data calling request in a mini program, where the data calling request includes the academic certificate of the user B, and the decentralized identity alliance chain assigns a second decentralized identity to the Company A when verifies that the Company A is legal. The decentralized identity alliance chain requests the data authorization and verification alliance chain to query the academic certificate of the user B by using the first decentralized identity of the user B to according to the second decentralized identity.

In some embodiments, User B may have only one data authorization certificate, such as an academic certificate, or may have multiple types of data authorization certificates, such as degree certificate of User B.

In some embodiments, the decentralized identity alliance chain sends a query request to the data authorization alliance chain to query the data authorization certificate of the data authorization user after the data calling user is authenticated legal. The data authorization alliance chain returns the data authorization certificate of the data authorization user to the decentralized identity alliance chain according to the query request. The decentralized identity alliance chain initiates a data authorization request according to the data authorization certificate, and digitally signs the data authorization request by using a pre-stored private key, generates authorization request verification information, and sends the authorization request verification information to the mini program on the second terminal corresponding to the data authorization user.

In some embodiments, the authorization request verification information includes any one of a two-dimensional code, a barcode, and a verification code. The decentralized identity alliance chain initiates a data authorization request according to the data authorization certificate, digitally signs the data authorization request by using the pre-stored private key, generates a two-dimensional code, and sends the two-dimensional code to the mini program on the second terminal corresponding to the data authorization user; or, the decentralized identity alliance chain initiates a data authorization request according to the data authorization certificate, digitally signs the data authorization request by using the pre-stored private key, generates a bar code, and sends the bar code to the mini program on the second terminal corresponding to the data authorization user; or, the decentralized identity alliance chain initiates a data authorization request according to the data authorization certificate, digitally signs the data authorization request by using the pre-stored private key, generates a verification code, and sends the verification code to the mini program on the second terminal corresponding to the data authorization user.

In some embodiments, the verification code may be in a variety of forms such as pictures, letters or numbers.

The present application is illustrated by generating a two-dimensional code as an example, but is not intended to limit the scope of protection of the present application.

In some embodiments, after sending authorization request verification information to the second terminal corresponding to the data authorization user, the decentralized identity alliance chain acquires indication information that a verification operation is running returned by the mini program on the second terminal, verifies the first decentralized identity of the data authorization user and the data authorization certificate according to the indication information that the verification operation is running, and sends the indication information of executing the data authorization operation to the mini program on the second terminal when the verification is legal.

In some embodiments, after authorization of the data authorization user is determined, a public key is used to encrypt a request result corresponding to the data calling request, and the encrypted request result is sent to the mini program corresponding to the first terminal.

In some embodiments, hash values of an identity authentication record corresponding to the identity authentication, the data authorization certificate, the data authorization request and a data authorization record corresponding to the data authorization request are respectively calculated by using a hash algorithm, and the hash values are stored in the data authorization and verification alliance chain.

In some implementations, the identity authentication record is a process that the data authorization user initiates the data preservation request until the data authorization user is authenticated legal, or a process in which the data calling user initiates a data calling request until the data authorization user is authenticated legal; the data authorization record is a process of initiating a data authorization request until the authorization of the data authorization user is determined.

The method provided by the embodiment of the present application, which is applied to an alliance chain, avoids that all data is stored in a central platform by utilizing the distributed characteristics of the alliance chain; in the present application, acquiring a data calling request sent by a first terminal, and performing identity authentication to the data calling user corresponding to the first terminal according to the data calling request, effectively solves the problem of illegal user intrusion, and assigning a second decentralized identity to the data calling user when the data calling user is authenticated legal, so that in the alliance chain the data calling user takes the second decentralized identity as the unique identity; querying a data authorization certificate of the data authorization user by using the first decentralized identity according to the second decentralized identity, sending a data authorization request to a second terminal corresponding to the data authorization user according to the data authorization certificate, and encrypting the request result corresponding to the data calling request after confirming that the data authorization user confirms the authorization, and sending the encrypted request result to the first terminal, thus effectively improves the data security.

Figure 3:
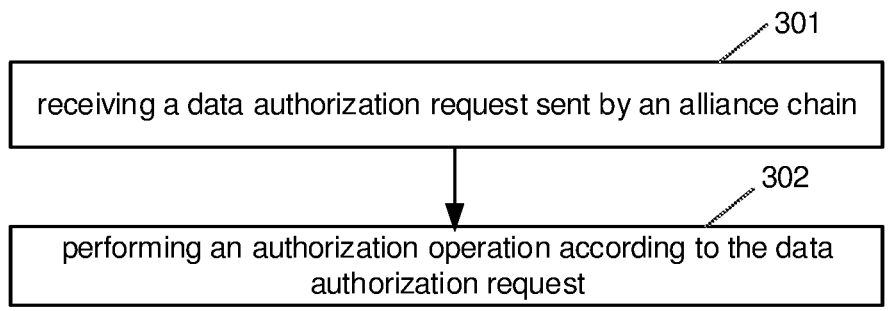
FIG. 3 is a flow diagram of a method for data acquisition applied to a second terminal in an embodiment of the present application.

The present application relates to a method for data acquisition, the method is applied to a second terminal, the implementation of which is shown in FIG. 3:

Step 301, receiving a data authorization request sent by an alliance chain;
where, the data authorization request is sent by the alliance chain after: acquiring a data calling request sent by a first terminal; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity; where, the data calling request carries a first decentralized identity of a data authorization user and an identity of a data calling user; and Step 302, performing an authorization operation according to the data authorization request.

In some embodiments, the mini program of the second terminal receives the authorization request verification information sent by the decentralized identity alliance chain, verifies the authorization request verification information, and returns indication information that the verification operation is running to the decentralized identity alliance chain; waits to receive the indication information for executing a data authorization operation sent by the decentralized identity alliance chain, executes an authorization operation according to the indication information for executing the data authorization operation, and digitally sign the authorization operation by using a pre-stored private key.

In some embodiments, the authorization record can be viewed in a mini program.

In some embodiments, the authorization request verification information includes any one of a two-dimensional code, a barcode, and a verification code. When the authorization request verification information sent by the decentralized identity alliance chain and received by the mini program of the second terminal is a two-dimensional code, the mini program calls a code scanning function to scan the two-dimensional code, returns the indication information that the verification operation is running to the decentralized identity alliance chain; When the authorization request verification information sent by the decentralized identity alliance chain and received by the mini program of the second terminal is a bar code, the mini program calls a code scanning function to scan the bar code, and returns the indication information that the verification operation is running to the decentralized identity alliance chain; When the authorization request verification information sent by the decentralized identity alliance chain and received by the mini program of the second terminal is a verification code, it calls a verification function, inputting the verification code to verify the verification code, and returns the indication information that the verification operation is running to the alliance chain.

In some embodiments, the verification code may be in a variety of forms such as pictures, letters or numbers.

Figure 4:
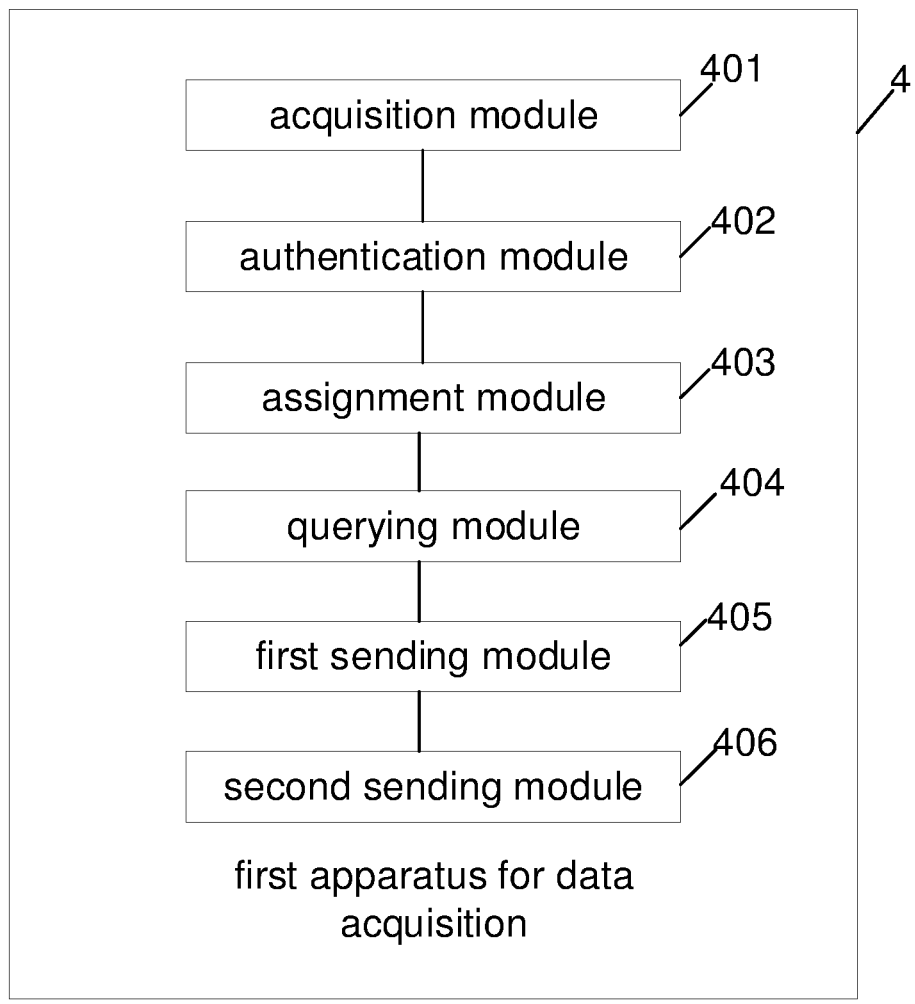
FIG. 4 is a structural diagram of a first data acquisition device in an embodiment of the present application.

The present application relates to a first apparatus for data acquisition 4, the implementation of which can be referred to in the description of the embodiment part of the method for data acquisition, and will not be illustrated repeatedly. As shown in FIG. 4:

an acquisition module 401, configured for acquiring a data calling request sent by a first terminal, where, the data calling request carries a first decentralized identity of a data authorization user and an identity of a data calling user;

an authentication module 402, configured for performing identity authentication to the data calling user corresponding to the first terminal according to the data calling request;

an assignment module 403, configured for assigning a second decentralized identity to the data calling user when the data calling user is authenticated legal;

a querying module 404, configured for querying a data authorization certificate of the data authorization user by using the first decentralized identity according to the second decentralized identity;

a first sending module 405, configured for sending a data authorization request to a second terminal corresponding to the data authorization user according to the data authorization certificate; and a second sending module 406, configured for encrypting the request result corresponding to the data calling request after confirming that the data authorization user confirms the authorization, and sending the encrypted request result to the first terminal.

Figure 5:
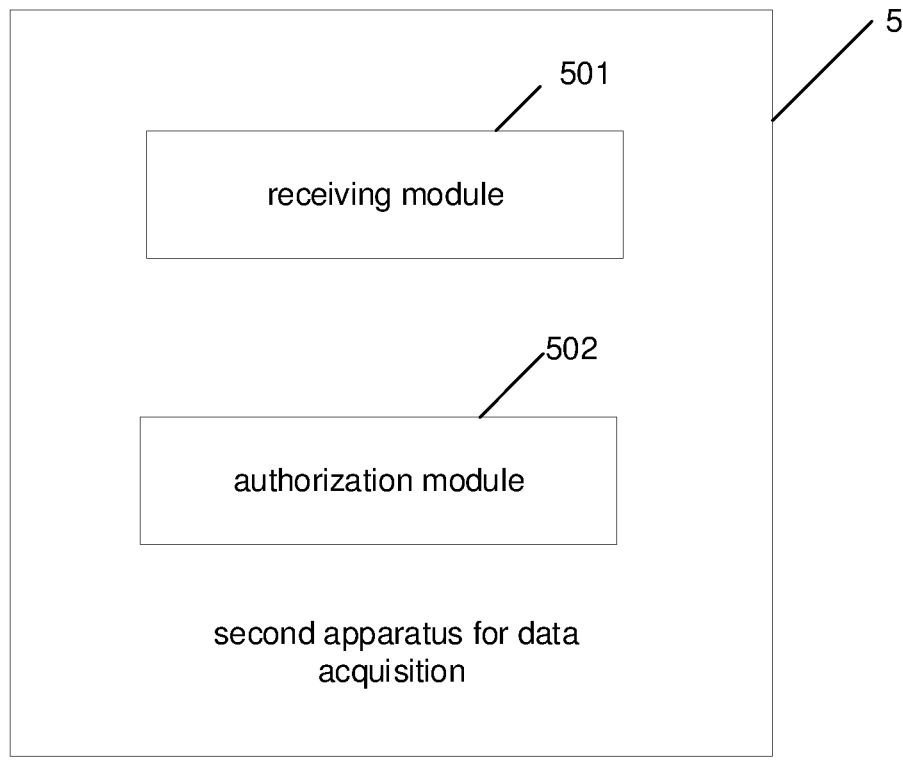
FIG. 5 is a structural diagram of a second data acquisition device in an embodiment of the present application.

The present application relates to a second apparatus for data acquisition 5, the implementation of which can be referred to in the description of the embodiment part of the method for data acquisition, and will not be illustrated repeatedly. As shown in FIG. 5:

a receiving module 501, configured for receiving a data authorization request sent by an alliance chain;

where, the data authorization request is sent by the alliance chain after: acquiring a data calling request sent by a first terminal; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity; where, the data calling request carries a first decentralized identity of a data authorization user and an identity of a data calling user; and an authorization module 502, configured for performing an authorization operation according to the data authorization request.

Figure 6:
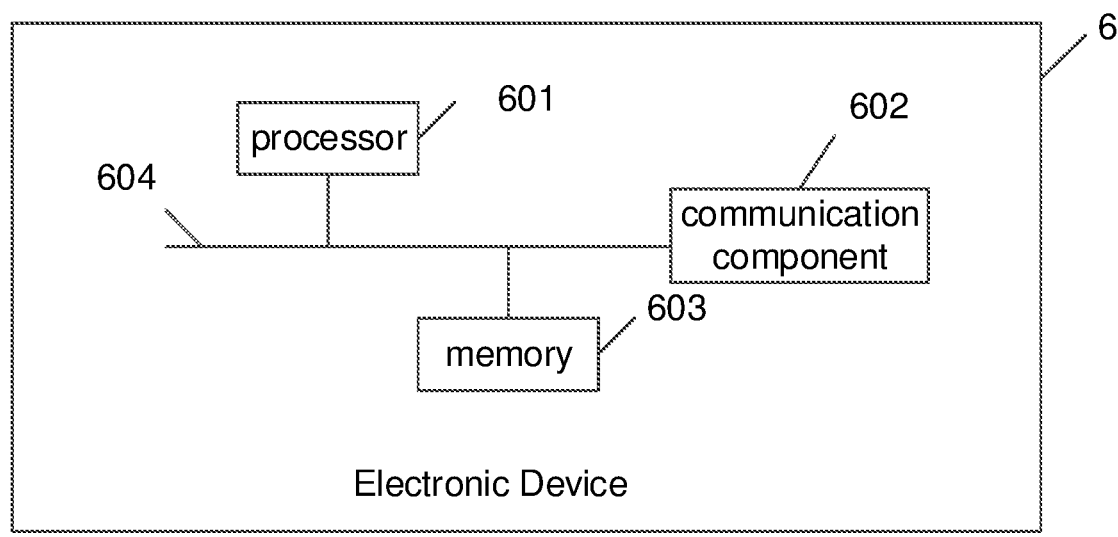
FIG. 6 is a schematic structural diagram of an electronic device in an embodiment of the present application.

Based on the same concept, the present application also relates to an electronic device 6, which, as shown in FIG. 6, mainly includes a processor 601, a communication component 602, a memory 603, and a communication bus 604, where the processor 601, the communication component 602, and the memory 603 communicate with each other through the communication bus 604. The memory 603 stores a program that can be executed by the processor 601, and the processor 601 executes the program stored in the memory 603 to realize the following steps: acquiring a data calling request sent by a first terminal, where, the data calling request carries a first decentralized identity of a data authorization user and an identity of a data calling user; performing identity authentication to the data calling user corresponding to the first terminal according to the data calling request; assigning a second decentralized identity to the data calling user when the data calling user is authenticated legal; querying a data authorization certificate of the data authorization user by using the first decentralized identity according to the second decentralized identity; sending a data authorization request to a second terminal corresponding to the data authorization user according to the data authorization certificate; and encrypting the request result corresponding to the data calling request after confirming that the data authorization user confirms the authorization, and sending the encrypted request result to the first terminal, or receiving a data authorization request sent by an alliance chain, and performing an authorization operation according to the data authorization request.

The communication bus 604 mentioned in the above-mentioned electronic device may be a Peripheral Component Interconnect (PCI) bus or an Extended Industry Standard Architecture (EISA) bus or the like. The communication bus 604 may be divided into an address bus a data bus a control bus and the like. For ease of presentation, only one thick line is used in FIG. 6, but it does not mean that there is only one bus or one type of bus.

The communication component 602 is used for communication between the electronic device and other devices.

The memory 603 may include a Random Access Memory (RAM) or a non-volatile memory or at least one disk memory. In some embodiments the memory may also be at least one storage device located remotely from the aforementioned processor 601.

The processor 601 may be a general-purpose processor, including a Central Processing Unit (CPU), a Network Processor (NP), etc., and may also be a Digital Signal Processor (DSP), an Application Specific Integrated Circuit (ASIC), a Field-Programmable Gate Array (FPGA), or other programmable logic devices, discrete gates or transistor logic devices, or discrete hardware components.

The present application also relates to a non-transitory computer-readable storage medium where a program is stored on the non-transitory computer-readable storage medium, the program, when run on the computer, implements the method for data acquisition applied to an alliance chain as described in the first embodiment applied to the alliance chain, or implements the method for data acquisition applied to a second terminal as described in the second embodiment.

In some embodiments it may be implemented in whole or in part by software hardware firmware or any combination thereof. When implemented in software, it can be implemented in whole or in part in the form of a computer program product. The computer program product includes one or more computer instructions. When the computer instructions are loaded and executed on a computer, the processes or functions described in accordance with embodiments of the present application are generated in whole or in part. The computer may be a general purpose computer, a special purpose computer, a computer network, or other programmable device. The computer instructions may be stored in, or transmitted from, a computer-readable storage medium to another computer-readable storage medium, e.g., from a Web site, computer, server, or data center via wired (e.g., coaxial cable, optical fiber, digital subscriber line (DSL)) or wireless (e.g., infrared, microwave, etc.) to another Web site, computer, server, or data center. The computer-readable storage medium may be any usable medium accessible to a computer or a data storage device such as a server, data center, etc. containing one or more usable media integration. The usable medium may be a magnetic medium (e.g., floppy disk, hard disk, magnetic tape, etc.), an optical medium (e.g., DVD), or a semiconductor medium (e.g. solid state disk), etc.

It should be noted that relational terms such as "first" and "second" are used herein only to distinguish one entity or operation from another, and do not necessarily require or imply any such actual relationship or order between these entities or operations. Moreover, the terms "including", "including" or any other variation thereof are intended to encompass non-exclusive inclusion, so that a process, method, article or equipment that includes a set of elements includes not only those elements but also other elements that are not explicitly listed or are inherent to such a process, method, article or equipment. In the absence of further limitations, an element defined by the phrase "includes an" does not preclude the existence of another identical element in the process, method, article or equipment in which the element is included.

The foregoing is only a specific embodiment of the present application to enable those skilled in the art to understand or implement the present application. Various modifications to these embodiments will be apparent to those skilled in the art and the general principles defined herein may be implemented in other embodiments without departing from the spirit or scope of the present application. Accordingly, the present application will not be limited to the embodiments shown herein, but is intended to conform to the widest scope consistent with the principles and novel features disclosed herein.

The invention claimed is:

1. A method for data acquisition, applied to an alliance chain, the method for data acquisition comprising:
    acquiring a data calling request sent by a first terminal, wherein, the data calling request carries a first decentralized identity of a data authorization user and an identity of a data calling user;
    performing identity authentication to the data calling user corresponding to the first terminal according to the data calling request;
    assigning a second decentralized identity to the data calling user when the data calling user is authenticated legal;
    querying a data authorization certificate of the data authorization user by using the first decentralized identity according to the second decentralized identity;
    sending a data authorization request to a second terminal corresponding to the data authorization user according to the data authorization certificate; and
    encrypting a request result corresponding to the data calling request after confirming that the data authorization user confirms the authorization, and sending the encrypted request result to the first terminal.

2. An electronic device comprises a processor, a communication component, a memory and a communication bus, wherein the processor, the communication component and the memory communicate with each other through the communication bus;
    the memory is configured for storing computer programs; and
    the processor is configured to implement the method for data acquisition applied to an alliance chain according to claim 1.

3. A non-transitory computer-readable storage medium, wherein a program is stored on the non-transitory computer-readable storage medium, wherein, the program, when executed by a processor, implements the method for data acquisition applied to an alliance chain according to claim 1.

4. The method for data acquisition according to claim 1, wherein, before querying the data authorization certificate of the data authorization user by using the first decentralized identity according to the second decentralized identity, the method further comprises:
    acquiring a data preservation request sent by the second terminal, wherein, the data preservation request carries the identity of the data authorization user;
    performing identity authentication to the data authorization user according to the data preservation request;

assigning the first decentralized identity to the data authorization user when the data authorization user is authenticated to be legal; and distributing the data authorization certificate to the data authorization user according to the first decentralized identity.

5. The method for data acquisition according to claim 1, wherein the data calling request further comprises: a data authorization certificate type; and querying the data authorization certificate of the data authorization user by using the first decentralized identity according to the second decentralized identity comprises:

querying the data authorization certificate type corresponding to the data authorization certificate type in the data calling request, by using the first decentralized identity according to the second decentralized identity.

6. The method for data acquisition according to claim 1, further comprising:

calculating hash values of an identity authentication record corresponding to the identity authentication, the data authorization certificate, the data authorization request and a data authorization record corresponding to the data authorization request respectively by using a hash algorithm, and storing the hash values in the alliance chain.

7. The method for data acquisition according to claim 1, wherein the data calling request comprises: an identity type of the data calling user;

performing identity authentication to the data calling user corresponding to the first terminal according to the data calling request comprises:

performing identity authentication to the data calling user by using a face recognition technology when the identity type of the data calling user is individual; and performing identity authentication to the data calling user by using an enterprise authentication technology when the identity type of the data calling user is enterprise.

8. The method for data acquisition according to claim 7, wherein, the data preservation request comprises: an identity type of the data authorization user;

performing identity authentication to the data authorization user according to the data preservation request, comprises:

performing identity authentication to the data authorization user by using the face recognition technology when the identity type of the data authorization user is the individual; and performing identity authentication to the data authorization user by using the enterprise authentication technology when the identity type of the data authorization user is the enterprise.

9. The method for data acquisition according to claim 1, wherein, sending the data authorization request to the second terminal corresponding to the data authorization user according to the data authorization certificate comprises:

initiating the data authorization request according to the data authorization certificate, and digitally signing the data authorization request by using a pre-stored private key, generating authorization request verification information, sending the authorization request verification information to the second terminal corresponding to the data authorization user.

10. The method for data acquisition according to claim 9, wherein the method further comprises:

acquiring indication information that a verification operation is running returned by the second terminal;

verifying the first decentralized identity of the data authorization user, and the data authorization certificate; and sending indication information for executing a data authorization operation to the second terminal when the verification is legal.

11. The method for data acquisition according to claim 9, wherein the authorization request verification information comprises any one of a two-dimensional code, a bar code and a verification code;

generating the authorization request verification information, sending the authorization request verification information to the second terminal corresponding to the data authorization user comprises:

generating the two-dimensional code and sending the two-dimensional code to the second terminal corresponding to the data authorization user;

or, generating the bar code and sending the bar code to the second terminal corresponding to the data authorization user;

or, generating the verification code and sending the verification code to the second terminal corresponding to the data authorization user.

12. A method for data acquisition, applied to a second terminal, the method for data acquisition comprising:

receiving a data authorization request sent by an alliance chain;

wherein, the data authorization request is sent by the alliance chain after: acquiring a data calling request sent by a first terminal; performing identity authentication to a data calling user corresponding to the first terminal according to the data calling request; assigning a second decentralized identity to the data calling user when the data calling user is authenticated legal; querying a data authorization certificate of a data authorization user by using the first decentralized identity according to the second decentralized identity; wherein, the data calling request carries a first decentralized identity of the data authorization user and an identity of the data calling user;

performing an authorization operation according to the data authorization request; and sending data authorization confirmation information indicating that the data authorization user confirms the authorization to the alliance chain.

13. An electronic device comprises a processor, a communication component, a memory and a communication bus, wherein the processor, the communication component and the memory communicate with each other through the communication bus;

the memory is configured for storing computer programs; and the processor is configured to implement the method for data acquisition applied to a second terminal according to claim 12.

14. A non-transitory computer-readable storage medium, wherein a program is stored on the non-transitory computer-readable storage medium, wherein, the program, when executed by a processor, implements the method for data acquisition applied to a second terminal according to claim 12.

15. The method for data acquisition according to claim 12, wherein receiving the data authorization request sent by the alliance chain comprises:

receiving authorization request verification information sent by the alliance chain;

performing the authorization operation according to the data authorization request comprises:

verifying the authorization request verification information, and returning indication information that the verification operation is running to the alliance chain;
receiving indication information for executing a data authorization operation sent by the alliance chain; and
executing an authorization operation according to the indication information for executing the data authorization operation, and digitally signing the authorization operation by using a pre-stored private key.

16. The method for data acquisition according to claim 15, wherein the authorization request verification information comprises any one of a two-dimensional code, a bar code and a verification code;
verifying the authorization request verification information, and returning indication information that the verification operation is running to the alliance chain comprises:
calling a code scanning function to scan the two-dimensional code, and returning indication information that the verification operation is running to the alliance chain;
or, calling a code scanning function to scan the bar code, and returning indication information that the verification operation is running to the alliance chain;
or, calling a verification function to verify the verification code, and returning indication information that the verification operation is running to the alliance chain.

17. A first apparatus for data acquisition, comprising:
an acquisition module, configured for acquiring a data calling request sent by a first terminal, wherein, the data calling request carries a first decentralized identity of a data authorization user and an identity of a data calling user;
an authentication module, configured for performing identity authentication to the data calling user corresponding to the first terminal according to the data calling request;
an assignment module, configured for assigning a second decentralized identity to the data calling user when the data calling user is authenticated legal;
a querying module, configured for querying a data authorization certificate of the data authorization user by using the first decentralized identity according to the second decentralized identity;
a first sending module, configured for sending a data authorization request to a second terminal corresponding to the data authorization user according to the data authorization certificate; and
a second sending module, configured for encrypting the request result corresponding to the data calling request after confirming that the data authorization user confirms the authorization, and sending the encrypted request result to the first terminal.

* * * * *